July 23, 1946.   I. NESSON   2,404,523
CONNECTOR FOR WINDSHIELD WIPER ARMS
Filed March 20, 1945
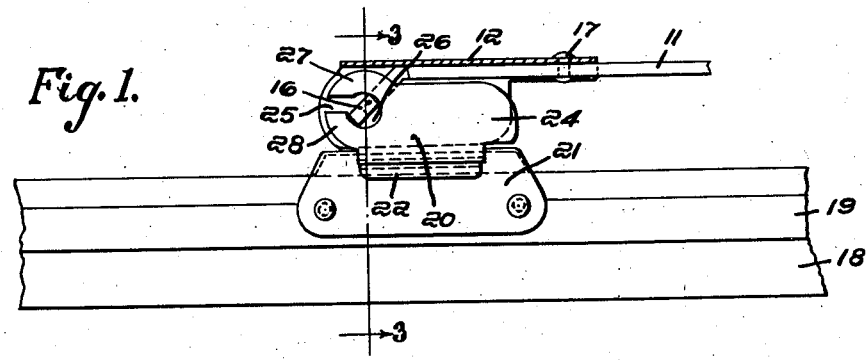
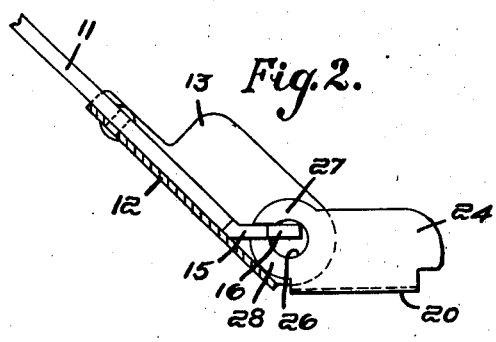
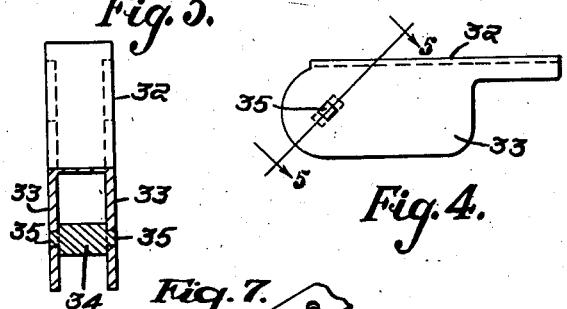
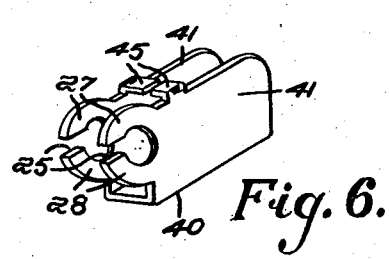
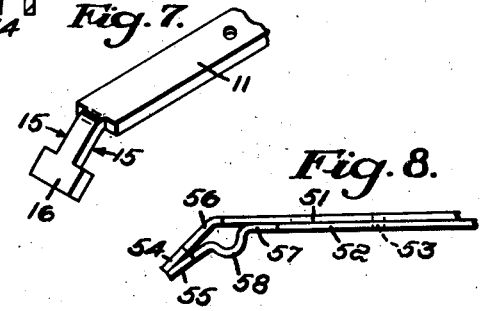
Inventor
Israel Nesson,
By Thomson & Thomson
Attorneys.

Patented July 23, 1946

2,404,523

UNITED STATES PATENT OFFICE 2,404,523

CONNECTOR FOR WINDSHIELD WIPER ARMS

Israel Nesson, Lynn, Mass., assignor to Max Zaiger, Swampscott, Mass.

Application March 20, 1945, Serial No. 583,820

10 Claims. (Cl. 287—103)

This invention relates to windshield wipers and pertains more particularly to improvements in the separable coupling or connector between the end of the wiper arm and the clip or hanger carried by the wiper blade.

The conventional types of connection heretofore usually employed for this purpose have comprised a hook carried by the arm and engaged in a slot formed in the blade hanger, or a hook projecting from the hanger and engaged in a slot formed in the end of the arm. These connections are loose, noisy and inefficient; and the wear between the protruding hooks and the slotted parts mars the surfaces and induces rusting of the worn areas.

It is the principal purpose of the present invention to obviate these objections to the conventional connectors by providing a new, efficient and economical type of attachment which avoids the use of the ordinary hook and slot connection, affords a smooth and true pivotal movement between arm and blade, and ensures security of the connected elements while permitting easy removal and replacement of the blade when desired.

Recommended embodiments of the invention are illustrated in the accompanying drawing, but it will be understood that the structural details of the devices herein shown and described may be varied without departing from the essence of this invention as defined in the appended claims. In the drawing, Fig. 1 is a side view of the central portion of a wiper blade and the end portion of a wiper arm operatively attached by the improved connection, the U-shaped end attachment of the wiper arm being shown in section;

Fig. 2 is a detail side view of the wiper arm end and the connector, illustrating the position of the parts when the arm is to be applied to or detached from the connector, the end attachment being shown in section;

Fig. 3 is a section on line 3—3 of Fig. 1;

Fig. 4 is a side view of the U-shaped end attachment of the wiper arm, illustrating a modification of its coupling means;

Fig. 5 is a section taken on line 5—5 of Fig. 4;

Fig. 6 is a perspective view of a modified form of connector adapted for use either with a hook-type arm or with the improved types of arm end shown in Figs. 1 to 5;

Fig. 7 is a detail perspective view of the end portion of the wiper arm of Figs. 1 to 3, with the U-shaped attachment removed; and Fig. 8 is a detail side view of a modified form of arm end, with the U-shaped attachment removed.

In the form of the invention illustrated in Figs. 1 to 3 and 7, the forward end of the wiper arm 11 is equipped with a U-shaped attachment 12 having parallel depending sides 13 which straddle the end portion of the arm, and the extreme end of the arm is inclined downwardly between the sides 13 and formed with marginal notches or recesses 15, thereby providing a T-shaped tip terminating in a hinge bar or pivot 16 which bridges the space between the sides 13 and is disposed at an inclined angle with respect to the plane of the arm. The wiper arm 11 may be a thin bar of metal, and the U-shaped attachment may be a metal stamping; and these parts are fastened together, as shown, by a rivet 17. It will be understood that the rearward end of the elongate arm may be suitably connected to a motor (not shown) which swings the arm and the blade attached thereto across the surface of the windshield.

The wiper blade 18 and its holder or casing 19 may be of any usual form and construction, and may be attached in any suitable manner to the connector or hanger 20. As here shown and as more fully described in Zaiger Patent 2,280,566, dated April 21, 1942, the attachment provides for lateral tilting or rocking of the connector with respect to the blade, and comprises a saddle or sub-clip 21 riveted to the blade holder, a bearing plate 22 and a hinge plate 23 for pivotally attaching the U-shaped connector or clip 20 to the saddle 21. This type of attachment is not material to this invention which relates to the improved pivotal connection or coupling between the clip 20, however attached to the blade, and the wiper arm 11.

For that purpose, the clip or connector 20 comprises a pair of parallel side members 24 receivable between the sides 13 of the attachment 12. Each of the sides 24 has an endwise slot 25 disposed substantially parallel to the blade and communicating with a relatively large circular opening 26, the axially aligned openings of the respective sides constituting a retaining socket for pivotal movement of the hinge bar 16 of the wiper arm which is insertable therein through the slots 25 when the parts are in the inoperative position shown in Fig. 2. The hinge bar is non-circular and preferably rectangular in cross-section, and it will be appreciated that the thickness of the rectangular bar portion 16 of the T-shaped end of the arm should be slightly less than the width of the slots 25, and that the width of the bar should be slightly less than the diameter of the openings 26, to afford proper clearance for easy application and removal of the arm end while ensuring a pivotal connection when the parts are operatively attached by swinging the arm to operative position, such as the position of Fig. 1.

The side recesses 15 of the T-shaped arm end have sufficient width and depth to accommodate the curved upper jaws 27 of the connector sides, so that the arm may be freely swung from the position of Fig. 2 to the position of Fig. 1. The outer edges of the upper jaws 27 and the lower jaws 28 which define the slots 25 and openings 26, are arcs of circles centered in said openings, so that said edges constitute guides or bearings for the top of the U-shaped attachment 12. The peripheries of said jaws thus guide the angular movement of the arm relative to the connector, on the pivot formed by the hinge bar 16; and the interfitting sides of the attachment 12 and connector 20 prevent relative lateral movement between the connected parts. Smooth and non-chattering operation of the wiper blade is thus ensured even though the actual operative angle between the arm and blade is substantial, and separation of the wiper elements is possible only when the arm is moved to the position of Fig. 2.

The hinge bar at the end of the wiper arm obviously need not be an integral part of the arm, as shown in Figs. 1, 2 and 7, and the U-shaped member 12 need not be a separate attachment, so long as the forward end of the arm is provided with depending sides 13 which embrace the sides of the connector, and with a hinge bar suitably fixed between the sides 13.

In Figs. 4 and 5, for example, the end attachment 32 of the wiper arm (whether a separate part or integral with the arm) has depending sides 33, and a hinge bar 34 bridges the space between the sides and is fixed therebetween at the desired inclination by lugs 35 secured in complemental openings in said sides.

In the modification illustrated in Fig. 6, the connector or clip 40 is similar to the clip 20 of Figs. 1 to 3, but its sides 41 are provided with tabs 45 bent inwardly from their upper edges and serving as a cross-link to which the hooked end of a conventional wiper arm may be connected by passing the hook between the sides 41 to engage the link. This type of connector may thus be selectively used with the conventional hooked arm or with the improved arm therein disclosed.

In order to prevent accidental separation of the connected parts when the hinge bar is aligned with the connector slots, as in the position of Fig. 2, the arm end may be provided with a spring element, as shown in the further modification of Fig. 8, to resist separation while permitting easy normal attachment of the wiper arm. The modified arm end consists of two thin strips 51 and 52 secured in superposed relation, as by a rivet passed through complemental holes 53 therein, and also serving to fasten said strips to a U-shaped attachment in the relation illustrated in Figs. 1 and 2. The extreme ends of both strips are inclined downwardly and terminate in co-operating hinge bars 54 and 55 respectively, defined by the edge recesses 56 and 57, as heretofore explained; but the narrow portion of the bottom strip 52 is bowed outwardly at 58, thereby springing the respective hinge bars to inwardly diverging relation, as shown in Fig. 8.

The resiliently diverged hinge bars may be readily pressed through the connector slots when the wiper arm is applied to the connector, but will lock the arm pivot in the retaining sockets 26 until the hinge bars 54 and 55 are brought into parallel relation, as by finger pressure on the bow 58 to flex the bottom strip, when the wiper elements are to be separated.

I claim:

1. A coupling for separably and pivotally connecting a windshield wiper arm to a wiper blade, comprising a connector fastened to the blade and having a side member extending parallel to the blade and provided with a slot entering one end thereof and a relatively large opening therethrough in communication with said slot, and a complemental attachment at the end of the wiper arm, including a transverse hinge bar of non-circular cross-section, the bar being receivable in said opening by passing it edgewise through said slot when the wiper arm is in an inoperative position and being rotatably retained within said opening when the arm is in operative position.

2. A coupling for separably and pivotally connecting a windshield wiper arm to a wiper blade, comprising a connector fastened to the blade and having an end portion formed with arcuate edges, said end portion having a relatively narrow slot and a relatively large opening disposed in communication therewith, and a complemental attachment at the end of the wiper arm, including a transverse hinge bar of non-circular cross-section and a top part overhanging said bar, the bar being receivable in said opening by passing it edgewise through said slot when the arm is in an inoperative position and being rotatably retained within said opening when the arm is in operative position with respect to the blade, and said top part engaging said arcuate edges and being guided thereby while the pivotally attached arm is swung relative to the blade.

3. A coupling for separably and pivotally connecting a windshield wiper arm to a wiper blade, comprising a connector fastened to the blade and having upstanding sides each formed with a slot at one end of the connector and a relatively large opening in communication with the slot, the openings in the respective sides being axially aligned, and an attachment at the end of the wiper arm, having depending sides adapted to embrace said connector sides, and a hinge bar of non-circular cross-section disposed between the sides of said attachment, said bar being receivable in said openings through said slots when the wiper arm is in an inoperative position and being pivotally retained therein when the arm is in operative position relative to the blade.

4. A coupling for separately and pivotally connecting a windshield wiper arm to a wiper blade, comprising a connector fastened to the blade and having upstanding sides each formed with a slot at one end of the connector and a relatively large circular opening in communication with the slot, the openings in the respective sides being axially aligned and constituting a pivotal bearing, and an attachment at the end of the wiper arm, having depending sides adapted to embrace said connector sides, and a hinge bar disposed between the sides of said attachment, said bar being receivable in said openings through said slots when the wiper arm is in an inoperative position and being pivotally retained therein when the arm is in operative position relative to the blade, the bar being substantially rectangular in cross-section and of a width and thickness corresponding respectively to the diameter of the openings and the width of the slots.

5. A coupling for separably and pivotally connecting a windshield wiper arm to a wiper blade, comprising a connector fastened to the blade and having upstanding sides each formed with a slot at one end of the connector and a relatively large circular opening in communication with the slot, the openings in the respective sides being axially aligned and constituting a pivotal bearing, and an attachment at the end of the wiper arm having depending sides adapted to embrace said connector sides, and a hinge bar of non-circular cross-section disposed between the sides of said attachment, said bar being receivable in said openings through said slots when the wiper arm is in an inoperative position and being pivotally retained therein when the arm is in operative position relative to the blade, said slots being substantially parallel to the plane of the blade and said bar being substantially rectangular in cross section and disposed at an inclined angle with respect to the plane of the wiper arm.

6. A coupling for separably and pivotally connecting a windshield wiper arm to a wiper blade, comprising a connector fastened to the blade and having upstanding sides each having an end portion formed with an arcuate edge, a relatively narrow slot and a relatively large opening in communication therewith, the openings in the respective sides, being aligned and centered with respect to said edges, and the slots extending forwardly of the openings toward said arcuate edges, and an attachment at the end of the wiper arm having depending sides adapted to embrace said connector sides and having a top adapted to slide on said arcuate edges when the parts are pivotally connected to guide relative movement thereof, and a hinge bar of non-circular cross-section disposed between the sides of said attachment, said bar being receivable in said openings through said slots when the arm is in an inoperative position and being rotatably retained therein when the arm is in operative position relative to the blade.

7. A coupling for separably and pivotally connecting a windshield wiper arm to a wiper blade, comprising a connector fastened to the blade and having upstanding sides each having an end portion formed with an arcuate edge, a relatively narrow slot and a relatively large opening in communication therewith, the openings in the respective sides being aligned and centered with respect to said edges, and the slots extending forwardly of the openings toward said arcuate edges, and an attachment at the end of the wiper arm having depending sides adapted to embrace said connector sides and having a top adapted to slide on said arcuate edges when the parts are pivotally connected to guide relative movement thereof, and a hinge bar of substantially rectangular cross-section disposed between the sides of said attachment in a plane oblique to the plane of said top, said bar being receivable in said openings through said slots when the arm is in an inoperative position and being rotatably retained therein when the arm is in operative position relative to the blade, the width and thickness of said bar corresponding respectively to the size of the openings and the width of the slots.

8. A coupling for separably and pivotally connecting a windshield wiper arm to a wiper blade, comprising a connector fastened to the blade and having upstanding sides each formed with a slot at one end of the connector and a relatively large circular opening in communication with the slot, the openings in the respective sides being axially aligned and constituting a pivotal bearing, and an attachment fastened to the wiper arm and having depending sides straddling the end portion thereof and adapted to embrace said connector sides, the end of the arm being downwardly inclined and having a substantially T-shaped tip providing a hinge bar disposed between the sides of said attachment, said bar being receivable in said openings through said slots when the wiper arm is in an inoperative position and being pivotally retained therein when the arm is in operative position relative to the blade.

9. A coupling for separably and pivotally connecting a windshield wiper arm to a wiper blade, comprising a connector fastened to the blade and having upstanding sides each formed with a slot at one end of the connector and a relatively large opening in communication with the slot, the openings in the respective sides being axially aligned, the end of the wiper arm being downwardly inclined and having a T-shaped tip providing a hinge bar receivable in said openings through said slots when the wiper arm is in an inoperative position and being pivotally retained therein when the arm is in operative position relative to the blade, the thickness of said bar being less than the width of said slots, and the width of the bar being greater than its thickness but less than the size of said openings.

10. A coupling for separably and pivotally connecting a windshield wiper arm to a wiper blade, comprising a connector fastened to the blade and having upstanding sides each formed with a slot at one end of the connector and a relatively large opening in communication with said slot, the openings in the respective sides being axially aligned, and an attachment at the end of the wiper arm consisting of a pair of superposed strips having downwardly bent ends, the sides of said strips being notched at the bends thereof providing flexible T-shaped tips constituting hinge bars receivable in said openings through said slots when the wiper arm is in an inoperative position and being pivotally retained therein when the arm is in operative position relative to the blade, the combined thickness of the bars corresponding approximately to the width of said slots, said strips being spaced from each other at their bends so that the respective hinge bars normally diverge from each other rearwardly of the tips, thereby to lock the bars in said openings until one of the strips is flexed toward the other to bring the bars into substantially parallel relation.

ISRAEL NESSON.